Dec. 26, 1967  J. H. PAUL ETAL  3,360,420
APPARATUS FOR FORMING SHAPED CUSHIONS
Filed Aug. 19, 1964  6 Sheets-Sheet 1

INVENTORS
JAMES H. PAUL
JAMES C. DICKINSON, Jr.
RICHARD L. SORRELL
BY
Semmes & Semmes
ATTORNEYS Dec. 26, 1967  J. H. PAUL ETAL  3,360,420
APPARATUS FOR FORMING SHAPED CUSHIONS
Filed Aug. 19, 1964  6 Sheets-Sheet 2
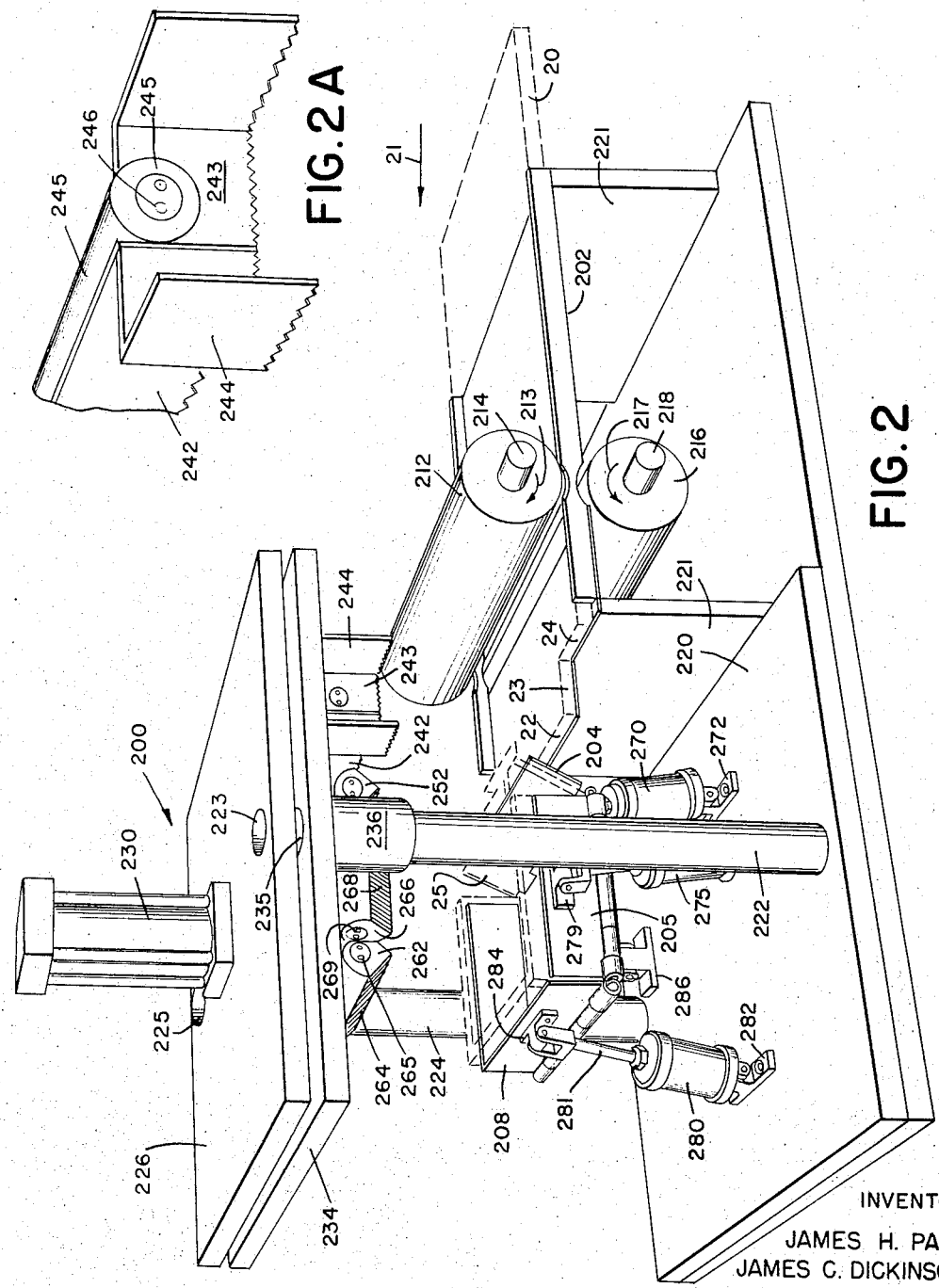
INVENTORS
JAMES H. PAUL
JAMES C. DICKINSON, Jr.
RICHARD L. SORRELL
BY Semmes & Semmes
ATTORNEYS Dec. 26, 1967 J. H. PAUL ETAL 3,360,420
APPARATUS FOR FORMING SHAPED CUSHIONS
Filed Aug. 19, 1964 6 Sheets-Sheet 3
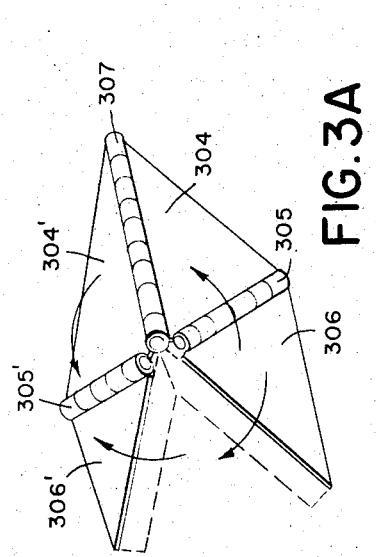
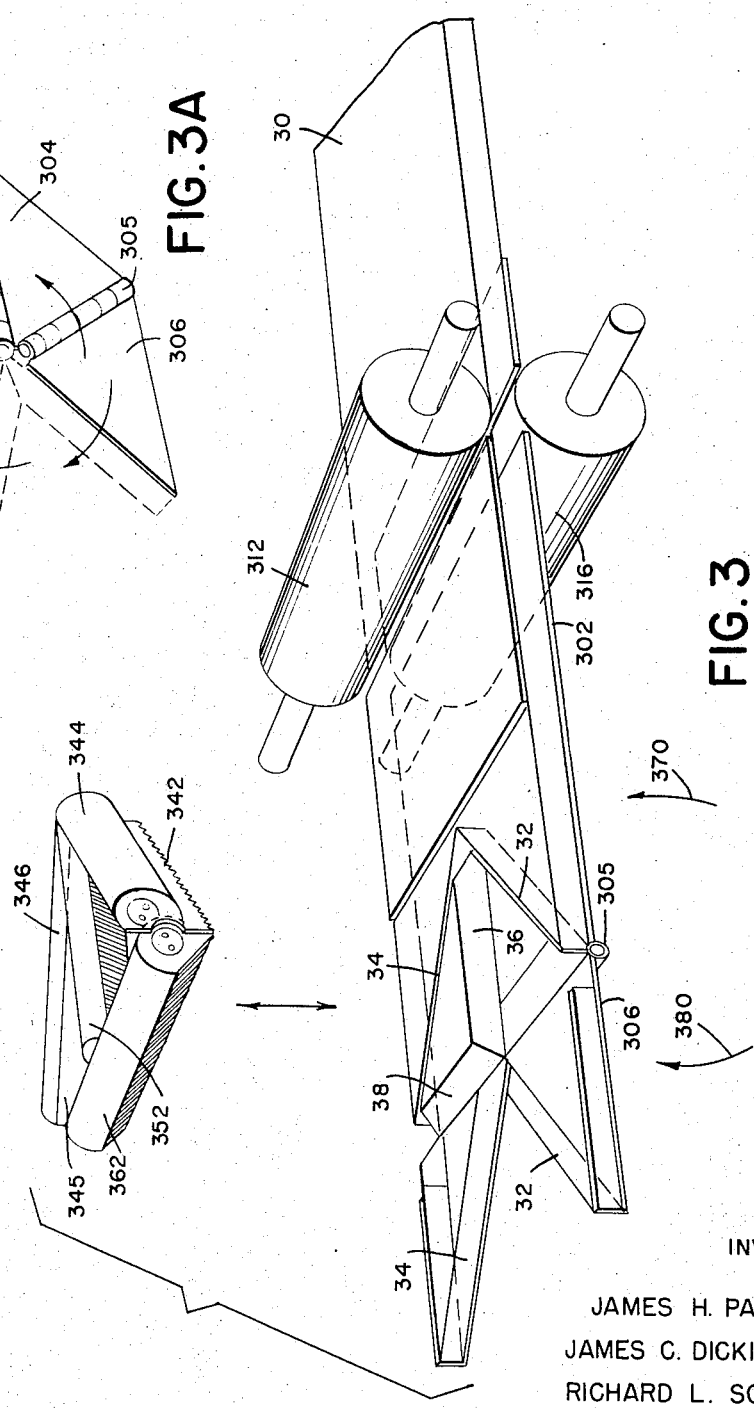
INVENTORS
JAMES H. PAUL
JAMES C. DICKINSON, Jr.
RICHARD L. SORRELL
BY
*Semmes & Semmes*
ATTORNEYS Dec. 26, 1967     J. H. PAUL ETAL     3,360,420
APPARATUS FOR FORMING SHAPED CUSHIONS
Filed Aug. 19, 1964     6 Sheets-Sheet 5

INVENTORS
JAMES H. PAUL
JAMES C. DICKINSON, Jr.
RICHARD L. SORRELL
BY
Semmes & Semmes
ATTORNEYS

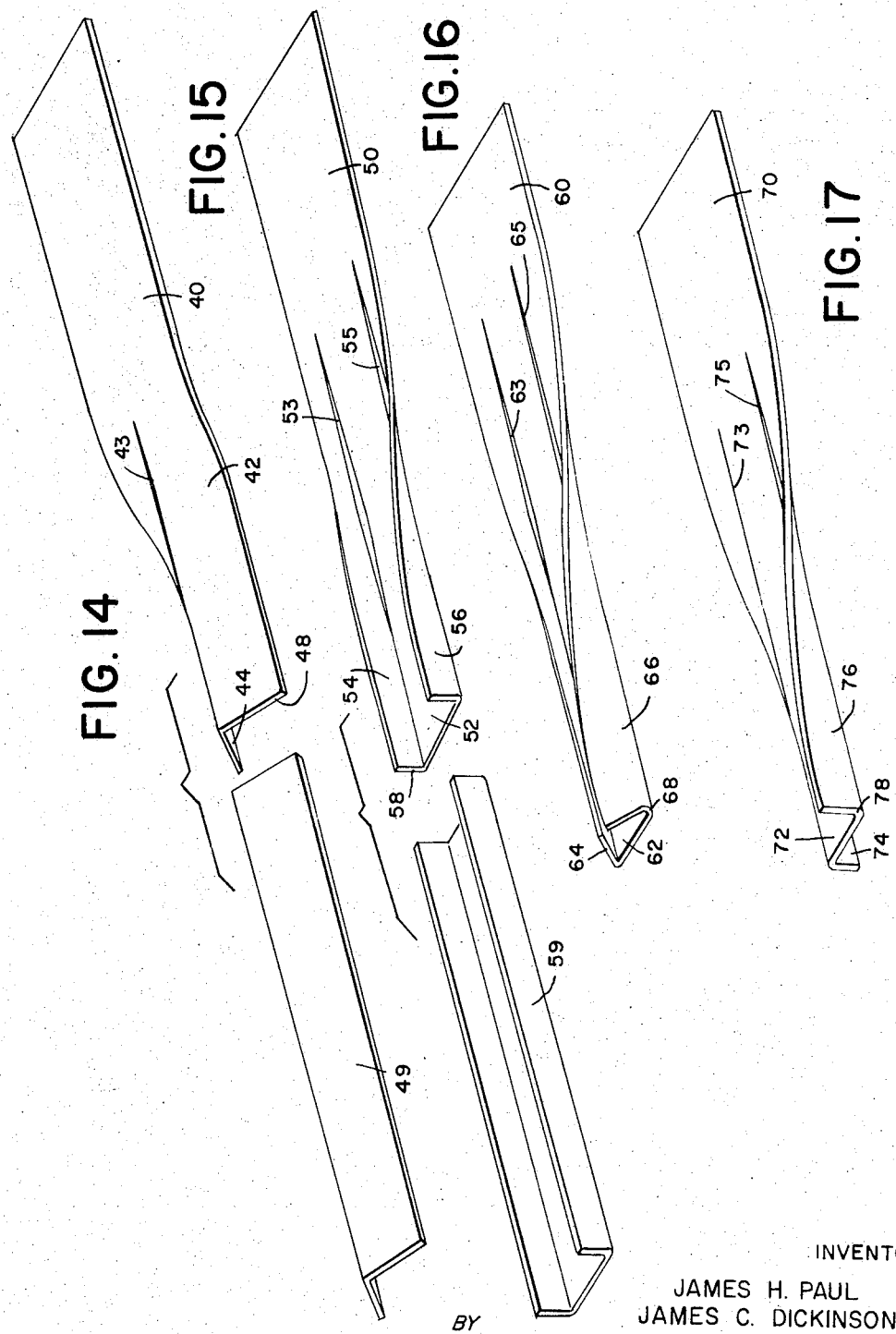

United States Patent Office 3,360,420
Patented Dec. 26, 1967

3,360,420
APPARATUS FOR FORMING SHAPED CUSHIONS
James H. Paul, 2438 Tanglewood Road, Decatur, Ga. 30033, James C. Dickinson, Jr., 4438 Briarcliff Road, Atlanta, Ga. 30329, and Richard L. Sorrell, 352 Colchester Drive, Stone Mountain, Ga. 30083
Filed Aug. 19, 1964, Ser. No. 390,619
2 Claims. (Cl. 156—492)

ABSTRACT OF THE DISCLOSURE

An apparatus for forming shaped cushions from thermoplastic sheet such as polyurethane and polystyrene, and including movable heating elements having their hot working surfaces adapted to melt that portion of the thermoplastic sheet in contact therewith, eliminating the necessity for conventional die molding and blow molding of corner pads.

---

This invention concerns the production of shaped pads from a cushion material. More precisely, this application discloses method and apparatus for forming shaped cushions from a sheet of expanded thermoplastic material. This application is a continuation in part of applicant's co-pending application Ser. No. 332,150, filed Dec. 20, 1963, and entitled, Method for Forming Corner Pads.

In packaging high-quality goods or any goods which are subject to breaking or marring, it is important to cushion edges and surfaces of the goods and to fill all voids. Previously, package protection has been accomplished by loose bulk material such as excelsior and shreded paper and even popcorn and other finely divided expanded materials. Cushioning has been provided by yieldable sheets and shapes made from corrugated cardboard, pasteboard and other materials. Recently, polystyrene, polyurethane foam sheets and other expanded synthetic materials have enjoyed increased use in the packaging industry. Although such synthetic materials are extremely useful in packaging, forming of peculiar shapes of the synthetic materials requires expensive processing. Die molding and blow molding methods primarily have been proposed or used for the manufacture of assorted shapes of the material. Those methods entail such expense that extensive investigation is concerned with finding more economical processes for using polystyrene and polyurethane foam sheets as packaging cushions.

The present invention provides the advantages of fast and efficient production and accomplishes a resultant low unit cost. Employing the process herein disclosed, especially configured polystyrene and polyurethane corner pads can be made competitive with similar packaging cushions produced by the corrugated board industry. The suggested machine is inexpensive to manufacture and, due to its small size and weight, it is extremely mobile. Thus, the machinery has the capability of being set up directly at the point where the packaging is being conducted.

The method of operation includes the steps of:

(1) advancing a blank piece of expanded thermoplastic stock in one plane;
(2) cutting, scoring or gouging, while heating the stock;
(3) folding a portion of the stock along its scoring and into another plane so that heated and melted walls of the scorings may flow together, thus welding the stock in folded position.

Some of the key elements used in the forming operation are the heated bodies. Each of the bodies is formed with a cutting or gouging surface for acting upon the stock. The source of heat within each body is a slip fit heating element. Interchangeable heating elements may be heated with an available source of power, such as superheated steam, electricity, or hot gases.

An object of the invention is the provision of a continuous process for forming shaped cushions from a sheet of expanded thermplastic material.

A second object of the invention is the provision of apparatus to continuously form shaped cushions from an expanded thermoplastic material, using a welding process.

Another object of the invention is the provision of heated bodies which will successfully groove and cut expanded thermoplastic material.

The invention has as an additional objective the provision of compact, transportable and relatively inexpensive apparatus adaptable to employ any available power source to convert sheets of thermoplastic material into shaped cushions.

Further objects of the invention will become apparent from the specification, claims and drawings, which illustrate several suggested embodiments for accomplishing the objectives of the invention.

In the drawings, FIGURE 1 is a perspective view of equipment for continually producing U-shaped channel cushions as illustrated in FIGURE 8 from an advancing sheet of thermoplastic material.

FIGURE 2 is a schematic representation of equipment for producing box-shaped cushions, as illustrated in FIGURE 9.

FIGURE 2A is a fragmentary detail of the heated cutting element shown in FIGURE 2.

FIGURE 3 and FIGURE 3A are schematic illustrations of equipment used to produce a three-surfaced corner pad.

Figure 12:
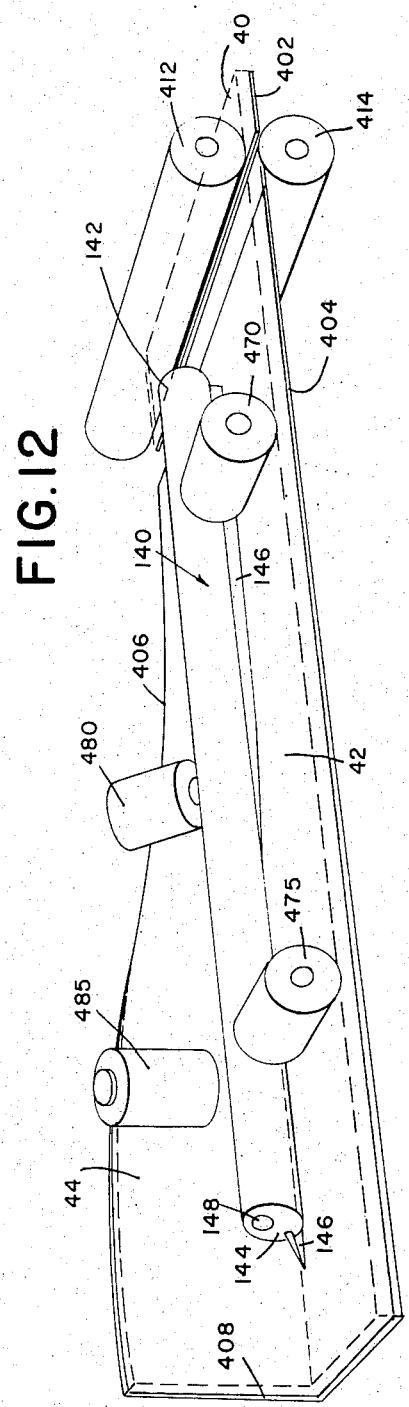
FIGURE 12 is a schematic representation of equipment used to gouge, fold and weld a sheet of thermoplastic material as it advances.

FIGURES 14 through 17 schematically illustrate the forming of various shaped cushions from the process disclosed in FIGURE 12.

Figure 1:
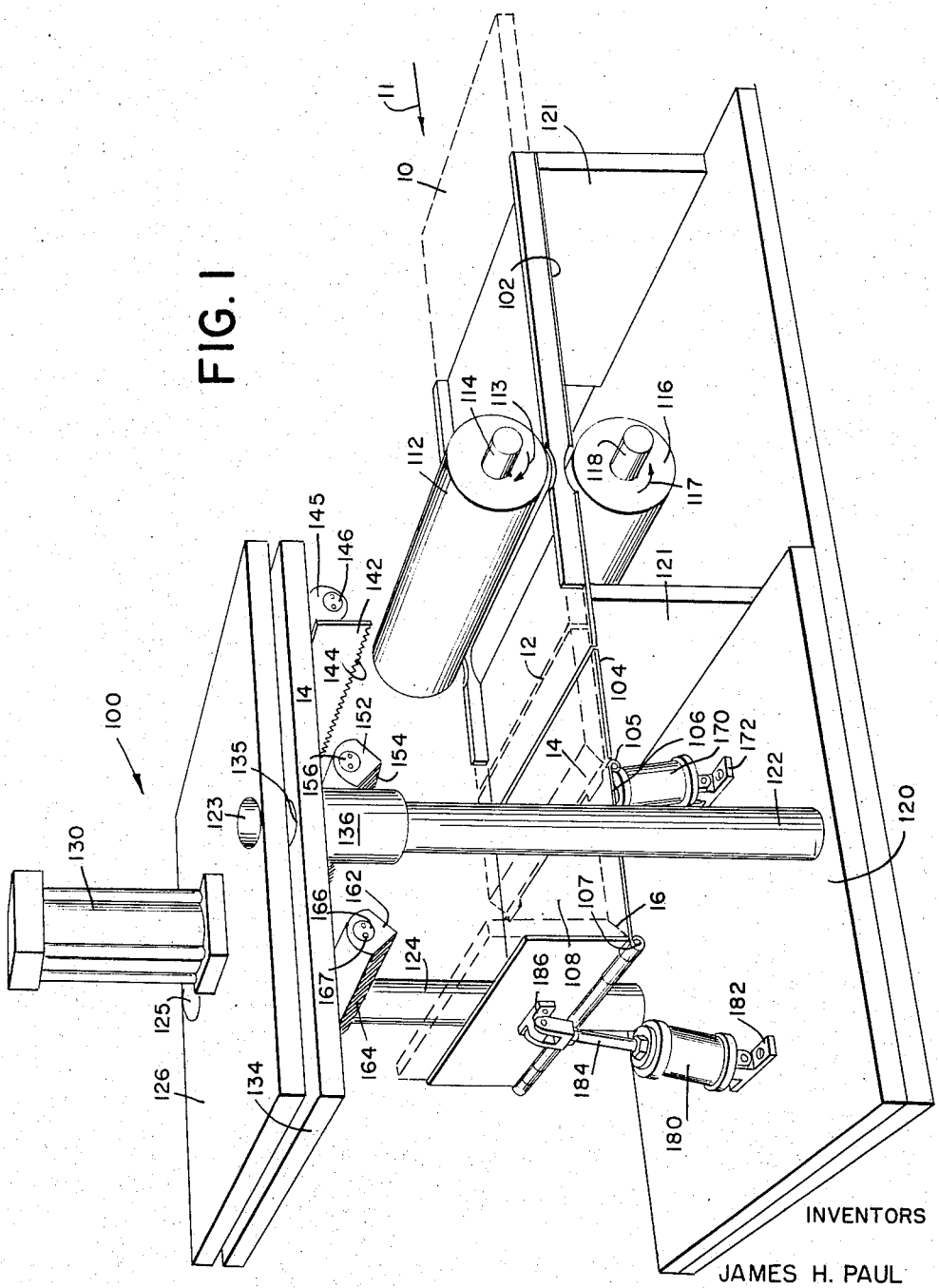
Figure 4:
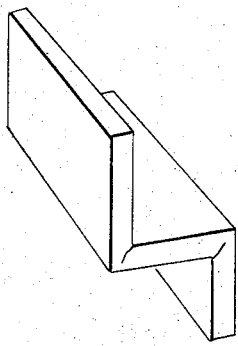
FIGURES 4–11 represent examples of various cushions capable of production by slight modifications to the equipment shown in FIGURES 1 through 3.

In FIGURE 1, machinery for forming a U-shaped channel cushion is generally indicated by the numeral 100. A horizontal table 102 supports a sheet of polystyrene foam 10. Complementary rollers 112 and 116 respectively rotate in the direction shown by arrows 113 and 117 about parallel shafts 114 and 118. The rollers, being spaced at a distance commensurate with the thickness of sheet 10, advance the sheet in the direction of arrow 11 toward the work table. The latter is made of three surfaces 104, 106 and 108, which are hinged together at 105 and 107. Base 120 supports columns 122 and 124, the respective upper ends of which are secured in holes 123 and 125 of overlying plate 126. Ram 130 selectively drives chuck plate 134 into and out of contact with the polystyrene sheet. Cylindrical guides 136, which are fixed directly under holes 135 in chuck 134, are mounted for sliding movement along posts 122 and 124. Firmly connected to the underside of chuck 134 are the heated bodies which operate upon the styrofoam sheet. 142 represents a blade having teeth 144 capable of slicing through the sheet. Blade 142 is interconnected to a flat side of heated body 145, which encompasses heating element 146. Spaced parallel from blade 142 is a heated gouging body 152 which defines a downwardly projecting gouging surface 154. A central opening running the entire length of body 152 receives elongated heating element 156. Third body 162, having gouging surface 164 is spaced from body 152. Resistance heating element 156 has electrical terminals 167.

Cylinder 170, which supports work table portion 104, is mounted on base 120 by bracket 172. Hydraulic cylinder 180 and its piston 184 respectively are pivoted between base 120 and table portion 108 by brackets 182 and 186.

As sheet 10 is advanced by rollers 112 and 116 slightly beyond surfaces 104, 106 and 108 of work table, ram 130 drives the hot working surfaces 144, 154 and 164 into sheet 10. The thermoplastic material is cut along line 12 and gouged at 14 and 16. Leaving the cut and gouged surfaces of the material in a substantially molten state, ram 130 withdraws the heated bodies from the material. While the material is still in its molten state, actuators 170 and 180 operate to fold work table portions 104 and 108 upwardly, causing the separated portion of the sheet to flow together and weld at gouged surfaces 14 and 16.

In FIGURE 2, arrow 21 indicates the direction of travel of expanded thermoplastic stock 20. Sheet 20 is propelled by parallel rollers 212 and 216, which respectively rotate about shafts 214 and 218 in the direction shown by arrows 213 and 217. Supported by legs 221, feed table 202 carries the thermoplastic sheet. Vertical columns 222 and 224, which are anchored in base 220, have their respective upper ends fixed in openings 223 and 225 in upper plate 226. Ram 230 vertically reciprocates chuck plate 234, guided by holes 235 and depending cylinders 236 which slidably receive shafts 222 and 224.

A plurality of heated bodies are fixed to the underside of chuck 234. Blade 242, its opposite transverse end portions 243 and parallel projections 244 respectively sever the advancing sheet along surfaces 22, 23 and 24. FIGURE 2A is a fragmentary view, showing how portions of the blade are interconnected with heated body 245, which is in turn mounted on the underside of chuck plate 234. One end of the heating element is indicated by numeral 246. Four gouging elements, represented by numbers 252, 266 and 262, are arranged in a quadrangle. Each of the heated bodies defines a downwardly aligned gouging surface 264 and 268. High temperatures of the bodies are maintained by inserted heating elements such as 265 and 269. After the cutting and gouging, surfaces are impressed in sheet 20, actuators 270, 275 and 280 and one other (not shown), inwardly fold portions 204, 205 and 208 of the work table. Thermoplastic material of the gouged and heated interfaces flows together, welding the walls of the box-shaped cushion.

FIGURE 3 schematically represents apparatus for producing three-surfaced corner pads. Rollers 312 and 316 cooperate to advance thermoplastic sheet 30 along feed table 302. Blades 342 and 345, which respectively depend from heated bodies 344 and 346, are coupled with gouging bodies 352 and 362. The entire cutting and gouging assembly is operable to reciprocally engage the advancing material 30. A portion of the material is severed along surfaces 32 and 34. Gouging bodies 352 and 362 create interconnected grooves 36 and 38. The work table is symmetrically divided into four portions by a hinge running directly under grooves 36 and 38. Four individual actuators such as those shown in FIGURE 2 fold the table portions inwardly. Detail FIGURE 3A illustrates work table portions 304, 304¹, 306 and 306¹, and the direction in which each folds about hinges 305, 305¹ and 307.

Figure 5:
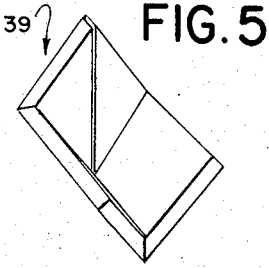
Figure 6:
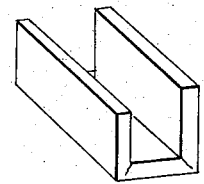
Figure 7:
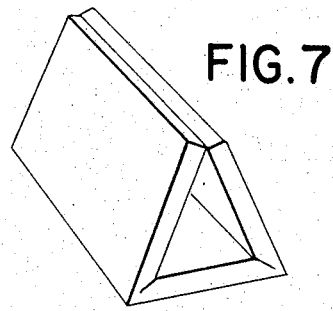
Figure 8:
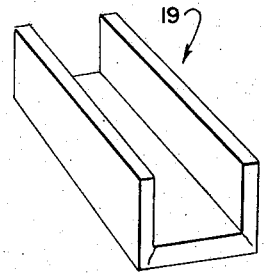
Figure 10:
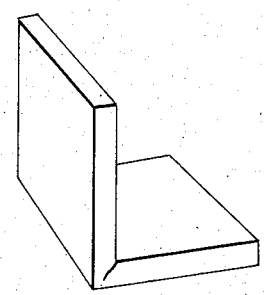
Figure 11:
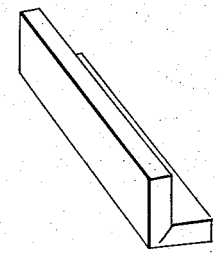
Figure 9:
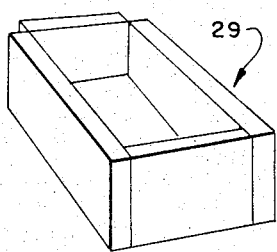

FIGURES 4–11 exemplify several cushions capable of production by machines similar to those shown in FIGURES 1, 2 and 3. Three-surfaced cushion 39 of FIGURE 5, is the end product of the process schematically shown in FIGURE 3. In the same manner, U-shaped channel cushion 19 shown in FIGURE 8 is the end product of the process and equipment demonstrated in FIGURE 1. Box 29 of FIGURE 9 is the product of apparatus 200 shown in FIGURE 2.

Figure 13:
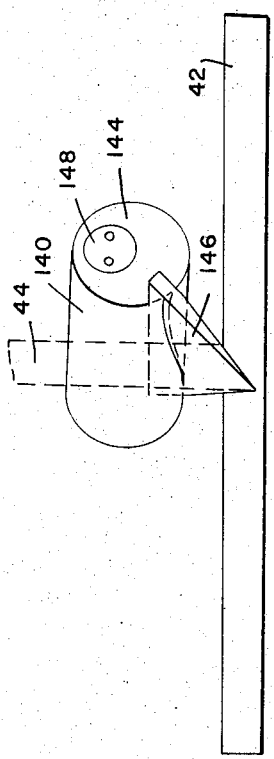
FIGURE 13 is an end view of the equipment shown in FIGURE 12.

In FIGURE 12, a sheet of expanded thermoplastic material 40 is advanced by oppositely rotating rollers 412 and 414 on feed table 402. The work table is smoothly curved in the direction of advancement from a flat portion 404 to a right oriented portion 406. An elongated heated body 140 slightly inclines from the direction of travel, as best shown in the end view of FIGURE 13. Blade 146 is uniformly warped from an upright position at the leading end 142 of the heated body to an angle of approximately 45° at the trailing end 144 of the heated body. As the material is advanced over the leading end of the blade, it is gouged thereby dividing it into two connected sections 44 and 42. The angle of the blade increases along the work table, thereby widening the gouge. At the same time, a portion 406 of the work table curves upwardly to maintain one edge of the folded portion 44 of the material in contact with the blade. As the tube portion 42 and 44 of the materials leave the trailing edge of blade 46 complementary edges are pressed together to form a weld. Throughout the entire operation, rotating rollers 470, 475, 480 and 485 maintain the progress of the material. As shown in FIGURE 13, heated body 140 mounts a heating element 148 similar to that shown in the preceding drawings.

FIGURE 14 schematically illustrates the production of an L-shaped cushion in which the material 40 is gouged and uniformly bent about a center line into joined walls 42 and 44. Severing the body along edge 48 forms the end product, an L-shaped cushion 49. Stock 50 is advanced in FIGURE 15, whereupon it is gouged and welded about respective interfaces 53 and 55. Consequently, walls 54 and 56 extend at right angles from the material's base 52. Severing the advancing strip at edge 58 yields the elongated U-shaped cushion labeled 59. In FIGURE 16, an advancing sheet 60 is gouged at surfaces 63 and 65. Re-entrantly bending opposite edges of the table forms a triangular cushion having base 62 and walls 64 and 66. The leading edge 68 substantially defines an isosceles triangle. In the same manner, in FIGURE 17 a progressing sheet 70 is gouged on opposite sides by lines 72 and 75. Bending the edges of the sheet while continuing the gouging results in a cushion having a Z-shaped cross section 78.

Although this invention has been described by way of several specific examples, this invention is not limited thereto. It will be obvious to someone skilled in the art that processes using heated bodies to cut, gouge and weld shaped cushions from a plastic stock may take innumerable forms. Therefore, this invention is not limited to the embodiments illustrated and described; the scope of the invention is defined only in the appended claims.

We claim:

1. An apparatus for forming shaped cushions from a thermoplastic sheet comprising:
   (A) a frame assembly including a feeding platform having a transverse opening therein;
   (B) a driving means positioned adjacent the opening in said platform, said driving means operatively engaging and advancing said sheet;
   (C) a generally horizontal table, spaced from said platform in continuation thereof, said table comprising a plurality of individual surfaces joined by hinges;
   (D) a plurality of heated bodies each having hot working surfaces adapted to melt that portion of the thermoplastic sheet in contact therewith, said heated bodies being spaced from said table and moveable as a unit into said sheet overlying said table, at least one of said bodies defining a cutting means adapted to slice through said sheet intermediate said table and said platform, the remainder of said bodies defining gouging means overlying said hinges, said gouging means being adaptable to gouge said sheet;
   (E) extensible actuator means interconnected between said surfaces of said table and said frame, said actuator means operable to fold said surfaces about said hinges.

2. An apparatus of claim 1, wherein more than one body defines cutting means oriented to cooperate in repeatedly cutting said sheet in a V-shape between said platform and said table, and wherein said additional bodies are oriented to gouge a first impression from the apex of a first V to the apex of a second V, and a second impression perpendicular to said first impression.

References Cited

UNITED STATES PATENTS

| | | | |
|---|---|---|---|
| 2,710,046 | 6/1955 | Markus et al. | 156—290 |
| 2,886,482 | 5/1959 | Huffman | 156—251 |
| 2,978,136 | 4/1961 | Ehrenfreund | 220—9 |

MORRIS SUSSMAN, *Primary Examiner.*

ALEXANDER WYMAN, *Examiner.*

W. J. VAN BALEN, *Assistant Examiner.*